United States Patent [19]

Whittingham

[11] 4,009,052
[45] Feb. 22, 1977

[54] CHALCOGENIDE BATTERY

[75] Inventor: M. Stanley Whittingham, Fanwood, N.J.

[73] Assignee: Exxon Research and Engineering Company, Linden, N.J.

[22] Filed: Apr. 5, 1976

[21] Appl. No.: 673,696

Related U.S. Application Data

[63] Continuation-in-part of Ser. No. 552,599, Feb. 24, 1975, abandoned, which is a continuation-in-part of Ser. No. 396,051, Sept. 10, 1973, abandoned.

[52] U.S. Cl. .................... 429/191; 429/193; 429/194; 429/199; 429/218; 429/229
[51] Int. Cl.$^2$ ........................... H01M 35/02
[58] Field of Search ............... 136/6 R, 6 LN, 6 L, 136/6 F, 6 FS, 20, 83 R, 100 R, 137, 154–155

[56] References Cited

UNITED STATES PATENTS

| | | | |
|---|---|---|---|
| 3,681,144 | 8/1972 | Dey et al. | 136/83 R |
| 3,791,867 | 2/1974 | Broadhead et al. | 136/6 R |
| 3,864,167 | 2/1975 | Broadhead et al. | 136/6 LN |

*Primary Examiner*—Anthony Skapars
*Attorney, Agent, or Firm*—Jack Matalon; M. A. Ciomek

[57] ABSTRACT

A battery is provided in which the anode contains as the anode-active material a metal selected from the group consisting of Group I$a$ metals, Group I$b$ metals, Group II$a$ metals, Group II$b$ metals, Group III$a$ metals and Group IV$a$ metals (lithium is preferred), the cathode contains as the cathode-active material a chalcogenide of the formula $MZ_x$ wherein M is an element selected from the group consisting of titanium, zirconium, hafnium, niobium, tantalum and vanadium (titanium is preferred); Z is an element selected from the group consisting of sulfur, selenium and tellurium, and $x$ is a numerical value between about 1.8 and about 2.1, and the electrolyte is one which does not chemically react with the anode or the cathode and which will permit the migration of ions from said anode-active material to intercalate the cathode-active material. A highly useful battery may be prepared utilizing lithium as the anode-active material, titanium disulfide as the cathode-active material and lithium perchlorate dissolved in tetrahydrofuran (70%) plus dimethoxyethane (30%) solvent as the electrolyte.

Alternatively, the battery may be constructed in the discharged state of a cathode containing as the cathode-active material an intercalated chalcogenide in which the intercalating species is derived from the same materials previously mentioned as being useful for the anode-active material and the chalcogenide would be the same as that previously described. In this alternate type of battery, the anode may merely be a substrate (e.g., a metal grid) capable of receiving the intercalating species deposited thereon.

24 Claims, No Drawings

CHALCOGENIDE BATTERY

REFERENCE TO RELATED APPLICATIONS

This application is a continuation-in-part of U.S. Ser. No. 552,599, filed Feb. 24, 1975, which in turn is a continuation-in-part of U.S. Ser. No. 396,051, filed Sept. 10, 1973, both now abandoned.

BACKGROUND OF THE INVENTION

This invention relates to batteries. In the past, batteries utilizing intercalation compounds of graphite and fluorine as the cathode-active material and lithium metal as the anode have been found to be useful as primary batteries, e.g., see U.S. Pat. No. 3,514,337. However, such batteries, although of relatively high energy density, suffer serious deficiencies in that they are primary batteries, i.e. they are not capable of being recharged. In contrast thereto, the present invention provides for batteries which in many cases have not only high energy densities but are also capable of being discharged and recharged over many cycles.

It is also well known (U.S. Pat. No. 3,711,334) to utilize molybdates (e.g. $MoO_4$) rather than the layered chalcogenides (e.g. $TiS_2$) employed in the instant invention. In this prior art reference, the cell is not rechargeable and the lithium of the anode is converted to lithium oxide during discharge. In the instant invention, the lithium ions intercalate into the chalcogenide and upon recharging are readily redeposited on the anode in the form of lithium metal.

Broadhead et al (U.S. Pat. No. 3,791,867) makes use of an intercalatable transition metal chalcogenide and a material such as lithium. However, this patent utilizes iodine, bromine, sulfur, selenium or tellurium as the cathode-active material and the transition metal chalcogenide merely serves as the host structure for the cathode-active material.

SUMMARY OF THE INVENTION

The present invention provides for batteries which may be fabricated either in a charged or discharged state. The components of the two types of batteries (denoted herein as the Charged Battery and the Discharged Battery) will now be described herein in greater detail.

I. CHARGED BATTERY

The Cathode

The cathode contains as the sole cathode-active material (1) an intercalatable dichalcogenide of the formula $MZ_x$, wherein M is an element selected from the group consisting of titanium, zirconium, hafnium, niobium, tantalum and vanadium; Z is an element selected from the group consisting of sulfur, selenium and tellurium, and x is a numerical value between about 1.8 and about 2.1, or (2) alloys of the aforesaid dichalcogenides with one another. For the purpose of this invention, no other electrochemically active material should be utilized as a cathode-active material. It should be noted that in the charged state, the intercalatable dichalcogenide contains no intercalated species.

The cathode structure itself need not necessarily consist of the cathode-active material but may be a structure such as carbon, nickel, zinc, etc. upon which the dichalcogenide is deposited. Preferably, the cathode structure consists entirely of the dichalcogenide. The cathode-active material is a good electronic conductor and may thus serve as its own current collector. The cathode-active material should not be admixed or diluted with any other electrochemically active material except that alloys (i.e. solid solutions) of the individual dichalcogenides may be used as well as the individual dichalcogenides. The cathode may be readily fabricated from the individual or alloyed dichalcogenides using materials and methods well known in the prior art, e.g., polytetrafluoroethylene bonding agents or support structures such as nickel or copper mesh.

The dichalcogenides to be utilized as the sole cathode-active material may be any compounds within the scope of the formula set forth above. Either the individual chalcogenides or alloys of the chalcogenides with one another may be used. Vanadium disulfide is not known to exist but theoretically it should possess the layered structure of the other disclosed dichalcogenides and should be similarly electrochemically active. Disulfides of vanadium and other transition metals, such as $V_{0.25}Ti_{0.75}S_2$, display the requisite electrochemical activity. Vanadium diselenide and vanadium ditelluride exist and display electrochemical activity. Preferably, M in the formula $MZ_x$ is titanium, Z is preferably sulfur and x preferably has a numerical value between about 1.95 and about 2.02. An especially useful cathode-active material is titanium disulfide.

The Anode

The anode contains as the anode-active material a metal selected from the group consisting of Group Ia metals, Group Ib metals, Group IIa metals, Group IIb metals, Group IIIa metals, Group IVa metals, and mixtures of the aforesaid metals with one another or with other substances such that the aforesaid metals can be electrochemically released from the mixture to intercalate, during discharge, the cathode-active material. Examples of such suitable substances are ammonia and amines. Preferably the anode-active material is selected from the group consisting of Group Ia metals, magnesium, calcium and zinc. Especially useful anode-active materials are lithium (most preferred), potassium and sodium. For the purpose of this invention, boron, carbon, silicon and germanium are not to be regarded as "metals" useful for the anode-active material.

As in the case of the cathode, the anode may be fabricated entirely from the above described metals or it may consist of an underlying structure (fabricated of a material such as aluminum, nickel, etc.) upon which the anode-active material is deposited.

The Electrolyte

The electrolyte useful for preparing the charged battery is one which does not chemically react with the anode or with the cathode and must be the type which will permit the migration of ions to intercalate the cathode-active material and vice-versa (during the discharge and charging cycles, respectively).

The electrolyte may be present in a pure state (in the form of a solid, fused solid or liquid) or it may be conveniently dissolved in a suitable solvent.

As a general rule, the electrolyte material should consist of a compound of the same species as that which is selected for the anode-active material. Thus, useful electrolytes may be conveniently represented by the general formula LY wherein L is a cationic moiety selected from the same materials useful as the anode-active material and Y is an anionic moiety or moieties such as halides, sulfates, nitrates, beta-aluminas, phosphofluorides, perchlorates and rubidium halide.

Especially useful electrolyte materials include $LiPF_6$, $LiClO_4$, sodium beta-alumina, KCNS, LiCNS, etc. The electrolyte may be present in a pure state in the form of a solid, fused solid (i.e. molten salt) or liquid or it may be conveniently dissolved in a suitable solvent such as water, alcohols, ketones, esters, ethers, organic carbonates, organic lactones, organic nitriles, nitrohydrocarbons, organic sulfoxides, etc. (such as propylene carbonate) and mixtures thereof (such as tetrahydrofuran (70%) with dimethoxyethane (30%)). Where the solvent is utilized, the electrolyte salt may be present in a concentration determined by the desired solution conductivity, solubility and chemical reactivity.

II. DISCHARGED BATTERY

The Cathode

It may be convenient to fabricate the cathode of the battery such that the battery is initially prepared in a discharged state. It has been found that where the cathode-active material consists of an intercalated dichalcogenide, manufacturing techniques for preparing the battery are made considerably easier and more economical.

In particular, it has been determined that intercalated dichalcogenides, particularly fully intercalated dichalcogenides, e.g., $LiTiS_2$, are relatively insensitive to the atmospheric conditions in contrast to the situation where the anode-active material consists of the intercalating species and the cathode-active material consists of the dichalcogenides. For example, where a battery is proposed to be made in the charged state, Group Ia metals such as lithium, sodium and potassium readily react with moisture and the gases normally present in the atmosphere to form oxides, nitrides, hydroxides, carbonates, etc., thereby diminishing the availability of ions of the Group Ia metals; in such situations, the battery with the anode-active material would ordinarily have to be fabricated in an inert atmosphere such as argon in order to prevent deterioration of the anode-active material. In contrast thereto, the cathode-active material may consist of the intercalated dichalcogenide prepared by the method described below and it has been determined that the intercalated dichalcogenide is relatively stable to atmospheric conditions, thereby eliminating the need for fabrication of the battery in an inert atmosphere.

The intercalated dichalcogenide utilized as the cathode-active material for the Discharged Battery is prepared from the same materials utilized as the anode-active material (these metals, or compounds thereof, thus serve as the source of the intercalating ions) and the same dichalcogenides denoted above as being useful for the cathode-active material.

Various methods for the preparation of the intercalated dichalcogenides are well known in the prior art. For example, see the Journal of Chemical Physics, Volume 58, page 697 et seq (1973), published German patent application No. 2,061,162, National Bureau of Standards Special Publication No. 364, page 625 et seq (1972), Journal of the Less-Common Metals, Volume 20, page 121 et seq (1970), Science, Volume 175, page 884 et seq (1972), C. R. Acad. Sc. Paris, Volume 276, page 1283 et seq (1973).

The Anode

In the case of the Discharged Battery, the anode may consist simply of a current-collecting structure (e.g., a wire, grid, or foil) which is capable of receiving the intercalating species of elemental form deposited thereon (the deposition would occur during activation or charging of the Discharged Battery). Where the cathode-active material consists of an intercalated dichalcogenide in its fully intercalated form, there will be generally sufficient amounts of the intercalating species available for deposition upon the anode to make it unnecessary that the anode also contain any additional anode-active material. Of course, if desired, the anode may have some anode-active material deposited thereon (the anode-active material would be the same as that employed for the Charged Battery), but in this case, the advantage of being able to fabricate the battery in the atmosphere (as distinguished from fabrication in the presence of an inert gas such as argon) is diminished.

Examples of anode materials useful for fabricating the substrate upon which the intercalating species is to be deposited in elemental form thereon during the charging cycle of the Discharged Battery include metals such as aluminum, nickel, etc.

The Electrolyte

The electrolyte comprises or contains a material which does not chemically react with the anode or the cathode and which will permit the migration of ions of the intercalating species from the cathode-active material to deposit on the anode (during the charging cycle). As a general rule, the electrolyte to be used for the preparation of the Discharged Battery may be any of the materials recited hereinabove for use as the electrolyte in the Charged Battery.

The term "Group" as applied to one or more elements or compounds refers to a particular Group of the Periodic Table of the Elements of the type set forth on the inside cover of *The Merck Index* (7th ed.).

The following examples shall serve to illustrate the Charged Battery and the Discharged Battery.

EXAMPLE 1

Charged Battery 9.22 g. of titanium wire and 12.3 g. of sulfur were heated at 750° C. for 18 days and then at 600° C. for 7 days in a sealed quartz tube. 2 g. of the titanium disulfide powder so formed were heated with 0.39 g. of iodine as transport agent in a temperature gradient, 900°–1000° C., for 18 days, and then at 600° C. for 2 days; this resulted in the formation of pure single crystals of titanium disulfide, $TiS_2$.

A 10 mg. crystal was then soldered to a copper wire and immersed in a saturated solution of lithium hexafluorophosphate in propylene carbonate which had been vacuum distilled. A sheet of lithium, 0.4 cm × 0.05 cm., served as the anode. All manipulations and cell testing were performed in a helium environment.

The voltage, under zero current drain, initially was about 3.0 volts. On short-circuiting the cell, a current falling from around 10 ma/cm², based on the active cathode surface, was observed. As discharge proceeded, the open circuit voltage decayed, thus for cathode compositions of $Li_{0.25}TiS_2$ and $Li_{0.75}TiS_2$ the open circuit voltages were 2.30 and 2.04 volts, respectively (corresponding to a 25% and 75% discharged state, respectively).

Recharge was accomplished by applying 4 volts across the cell. A current of similar magnitude and time dependence but of opposite sign was observed.

EXAMPLE 2

Charged Battery 0.52 g. of titanium disulfide powder was pressed onto a copper plate of 0.5 inches diameter. This was covered with a piece of filter paper as separator, and mounted in a "Teflon" holder. A few mils of a saturated solution of lithium hexafluorophosphate in propylene carbonate were poured into the holder followed by a lithium strip anode of dimensions 0.4 × 2.0 × 0.05 cm. A copper plunger was then screwed down tight in the "Teflon" holder. The cell electrical contacts were made through the copper plate and plunger.

The initial open circuit voltage was 2.84 volts. At a discharge rate of ⅛ ma., the cell voltage remained in the range 2.1–1.8 volts for several hours. On recharge at ⅛ ma., the applied voltage remained in the range of 2.5–3.5 V for several hours. Low depth cycling of the cell showed no apparent degradation of the system.

EXAMPLE 3

Discharged Battery

Lithium titanium sulfide, $Li_{1.0}TiS_2$, was prepared by adding 0.51 g. of titanium disulfide powder, made as in Example 1, to 4 ml. of a 1.6 molar solution of n-butyl lithium in normal hexane and allowing to stand for several days in a nitrogen atmosphere.

About 50 mg. of $Li_{1.0}TiS_2$ was pressed onto a copper plate, and the remainder of the cell was similar to that used in Example 2.

The initial open circuit voltage of this cell was 1.87 V. An attempt to further discharge this cell at a constant current of 0.2 ma., caused a rapid fall in the cell voltage, indicating that the system was essentially fully discharged. Recharge at ⅛ ma. was accomplished at applied voltages in the range of 2.4 to 3.1 volts.

EXAMPLE 4

Charged Battery 0.11 g. of cathode-active material consisting of 90% by weight of titanium disulfide powder and 10% by weight of "Teflon" binder was pressed into a stainless steel expanded metal screen; the area of each face of the screen was 2 cm². A lithium anode made by pressing lithium sheet (total amount of lithium was 0.5 g.) onto a nickel metal expanded screen (area of each face was 5 cm²) was placed on both sides of the cathode which was enclosed in a polypropylene separator bag. The electrolyte was a 1 molar solution of lithium perchlorate in a solvent consisting of 70% tetrahydrofuran and 30% 1,2-dimethoxyethane. The initial open circuit voltage of this cell was 2.8 volts.

The cell was then discharged to 20% of its capacity at which point it was cycled at 4 ma. (i.e. 1 ma/cm²), for 14 minutes on each cycle (this corresponds to 4% of the cell's theoretical capacity). Over 1,100 complete cycles were continuously performed; the voltages observed at the end of the indicated half cycles are shown in Table I below. The cell was then completely discharged, and on the subsequent recharge and discharge half cycles, over 80% and 70%, respectively, of the original theoretical capacity, based on the reaction $Li + TiS_2 \rightleftarrows LiTiS_2$, was available.

Also shown in Table I are the corresponding data from FIG. 2 of U.S. Pat. No. 3,791,867 for a cell containing a cathode in which the cathode-active material is intercalated in the host chalcogenide which is niobium diselenide. With the batteries of this invention, the voltage characteristics are more stable with time and there is a significantly lower polarization loss (i.e. smaller variation between charge and discharge voltages). Further, this invention makes use of the chalcogenides as the sole cathode-active material and not as a host (as is the case in U.S. Pat. No. 3,791,867, thereby offering considerable cost savings in construction and weight (and associated improvement in energy density).

TABLE I

| Cycle | This invention, volts | | '867 Patent, volts | |
|---|---|---|---|---|
| | Charge | Discharge | Charge | Discharge |
| 400 | 2.25 | 1.65 | 4.05 | 2.00 |
| 800 | 2.25 | 1.75 | 4.25 | 1.75 |
| 1100 | 2.40 | 1.75 | 5.50 | 1.45 |

In Table I, the differences between the voltage values within a particular column (i.e. charge or discharge column) reflect the degree of degradation of the cell over the test span of the indicated cycles. The differences between the columnar voltage values (i.e. between the charge and discharge columns) for a particular number of cycles reflect the degree of polarization which has occurred at the end of such number of cycles. The data for the instant invention clearly show substantially lower levels of degradation and polarization over that associated with the cells of U.S. Pat. No. 3,791,867.

EXAMPLE 5

A cathode was formed by hot-pressing 79.7 mg of a mixture (9:1) of titanium disulfide and Teflon onto 2 cm² of an expanded stainless steel mesh. This was surrounded first by polypropylene and Celgard separators and then by a sheet of lithium. The whole cell was immersed in an 0.85 molar solution of lithium tetrachloraluminate in methyl chloroformate. The initial open circuit voltage of 3 volts fell almost immediately to 2.5 volts on discharging at 10 ma; 94.3% of theoretical capacity was obtained, based on the reaction $Li + TiS_2 \rightarrow LiTiS_2$, to a cut-off voltage of 1.44 volts. The cell was recharged and then discharged at 20 ma; 60% of capacity was obtained at this rate and another 30% at 10 ma. Following another recharge, 65% of capacity of a drain of 20 ma was found to a cut-off of 1.3 volts. This was repeated for a total of 16 cycles at the 10 or 20 ma rate for an average utilization of over 58%.

EXAMPLE 6

A cell was constructed as described in the above example, but contained 62.5 mg of titanium disulfide and the electrolyte was an approximately 1 molar solution of lithium perchlorate in trimethylene formal (1,3-dioxane). The cell was then discharged at 4 ma. to 73% of capacity, at which point it was cycled at 3 ma. for 17 minutes (6% of capacity) for each cycle 125 times. This was then continued at 4 ma. (8%) for 87 cycles, at 5 ma. (10%) for 42 cycles, and then returned to 3 ma. for over 300 cycles.

EXAMPLE 7

A cathode was formed by hot-pressing 66 mg. of titanium disulfide into a molybdenum mesh; the area of the $TiS_2$ was just under 1 $cm^2$. An anode of 4 $cm^2$ area composed of a lithium-aluminum alloy (20:80 by weight) supported on a nickel mesh was constructed. These were immersed in a test tube containing a KCl/LiCl eutectic at 400° C. The initial open circuit voltage was 2.4 volts. The cell was then discharged at 100 ma. to a cut-off of 1.13 volts utilizing 75% of the theoretical capacity; the cell EMF at 50% of discharge was 1.9 volts. The cell was then recharged and discharged.

What is claimed is:

1. A battery comprising:
   a. an anode containing as the anode-active material a metal selected from the group consisting of Group I*a* metals, Group I*b* metals, Group II*a* metals, Group II*b* metals, Group III*a* metals, Group IV*a* metals, and mixtures containing the aforesaid metals such that the aforesaid metals can be electrochemically released from the mixtures;
   b. a cathode with a sole cathode-active material consisting essentially of
      1. a layered chalcogenide of the formula $MZ_x$ wherein M is an element selected from the group consisting of titanium, zirconium, hafnium, niobium, tantalum and vanadium; Z is an element selected from the group consisting of sulfur, selenium and tellurium, and $x$ is a numerical value between about 1.8 and about 2.05 or (2) alloys of the aforesaid chalcogenides with one another, said chalcogenides having a structure which will permit intercalation therein by ions of the anode-active material; and
   c. an electrolyte which does not chemically react with said anode or said cathode and which will permit the migration of ions from said anode-active material to intercalate said cathode-active material.

2. The battery of claim 1 in which the anode-active material is selected from the group consisting of Group I*a* metals, magnesium, calcium and zinc.

3. The battery of claim 2 in which the anode-active material is lithium.

4. The battery of claim 1 in which M is selected from the group consisting of Group IV*b* elements.

5. The battery of claim 4 in which M is titanium.

6. The battery of claim 1 in which Z is sulfur.

7. The battery of claim 1 in which $x$ has a numerical value of 1.95 to 2.02.

8. The battery of claim 1 in which the chalcogenide is titanium disulfide.

9. The battery of claim 1 in which the electrolyte comprises a Group I*a* inorganic metal salt in an organic solvent which does not chemically react with the anode or the cathode.

10. The battery of claim 1 in which the anode-active material consists of lithium, the electrolyte consists of lithium perchlorate in a mixture of tetrahydrofuran and dimethoxyethane and the cathode-active material consists of titanium disulfide.

11. A battery comprising:
   a. a cathode with a sole cathode-active material consisting essentially of an intercalated chalcogenide in which the intercalated species is a metal selected from the group consisting of Group I*a* metals, Group I*b* metals, Group II*a* metals, Group II*b* metals, Group III*a* metals, Group IV*a* metals, and the chalcogenide has the formula $MZ_x$ wherein M is an element selected from the group consisting of Group IV*b* elements, and Group V*b* elements; Z is an element selected from the group consisting of sulfur, selenium and tellurium; and $x$ is a numerical value between about 1.8 and about 2.05, said chalcogenide being present alone or as an alloy of the aforesaid chalcogenides with one another;
   b. an anode comprising a substrate capable of receiving said intercalated species deposited thereon; and
   c. an electrolyte which does not chemically react with said anode or said cathode and which will permit the electrochemical migration of ions of the intercalated species from said cathode-active material to deposit on said anode.

12. The battery of claim 11 in which the intercalated species is selected from the group consisting of Group I*a* metals, magnesium, calcium and zinc.

13. The battery of claim 12 in which the intercalated species is lithium.

14. The battery of claim 11 in which M is selected from the group consisting of Group IV*b* elements.

15. The battery of claim 14 in which M is titanium.

16. The battery of claim 11 in which Z is sulfur.

17. The battery of claim 11 in which $x$ has a numerical value of 1.95 to 2.02.

18. The battery of claim 11 in which the chalcogenide is titanium disulfide.

19. The battery of claim 11 in which the electrolyte comprises a Group I*a* inorganic metal salt in an organic solvent which does not chemically react with the anode or the cathode.

20. The battery of claim 11 in which the cathode-active material consists of titanium disulfide intercalated with lithium and the electrolyte consists of a solution of lithium perchlorate in a mixture of tetrahydrofuran and dimethoxyethane.

21. The battery of claim 1 in which the electrolyte is a molten salt.

22. The battery of claim 1 in which the electrolyte is a solid.

23. The battery of claim 11 in which the electrolyte is a molten salt.

24. The battery of claim 11 in which the electrolyte is a solid.

* * * * *